United States Patent
Wagner et al.

(10) Patent No.: US 9,752,910 B2
(45) Date of Patent: Sep. 5, 2017

(54) SENSOR SYSTEM FOR DETERMINING AT LEAST ONE PARAMETER OF A FLUID MEDIUM FLOWING THROUGH A CHANNEL

(71) Applicant: Robert Bosch GmbH, Stuttgart (DE)

(72) Inventors: Ulrich Wagner, Munich (DE); Torsten Mais, Ludwigsburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 240 days.

(21) Appl. No.: 14/573,724

(22) Filed: Dec. 17, 2014

(65) Prior Publication Data

US 2015/0168196 A1 Jun. 18, 2015

(30) Foreign Application Priority Data

Dec. 18, 2013 (DE) .......................... 10 2013 226 345

(51) Int. Cl.
*G01F 1/692* (2006.01)
*F02D 41/18* (2006.01)
*G01F 1/684* (2006.01)
*G01F 5/00* (2006.01)

(52) U.S. Cl.
CPC .......... *G01F 1/692* (2013.01); *F02D 41/187* (2013.01); *G01F 1/6842* (2013.01); *G01F 5/00* (2013.01)

(58) Field of Classification Search
CPC .......... G01F 1/692; G01F 1/72; G01F 1/6842; G01F 1/684; G01F 5/00; F02D 41/187
See application file for complete search history.

(56) References Cited

U.S. PATENT DOCUMENTS

| | | | | |
|---|---|---|---|---|
| 6,345,531 | B1* | 2/2002 | Mueller | G01F 1/6842 73/114.34 |
| 2010/0000308 | A1* | 1/2010 | Ariyoshi | G01F 1/72 73/114.32 |
| 2010/0300187 | A1* | 12/2010 | Renninger | F15D 1/001 73/114.42 |

FOREIGN PATENT DOCUMENTS

| | | |
|---|---|---|
| DE | 19738337 | 3/1998 |
| DE | 19815656 | 10/1999 |

OTHER PUBLICATIONS

Konrad Reif (editor): "Sensoren im Kraftfahrzeug [Motor Vehicle Sensors]," 1st edition, 2010, pp. 146-148.

\* cited by examiner

*Primary Examiner* — Paul West
*Assistant Examiner* — Xin Zhong
(74) *Attorney, Agent, or Firm* — Norton Rose Fulbright US LLP; Gerard Messina

(57) ABSTRACT

A sensor system is provided for determining at least one parameter of a fluid medium flowing through a channel, in particular an intake air mass flow of an internal combustion engine. The sensor system includes a sensor housing, in particular a plug-in sensor which is introduced or is introducible into a flow tube, in which the channel is formed, and at least one sensor chip which is situated in the channel for determining the parameter of the fluid medium. The sensor housing has an inlet into the channel which points counter to a main flow direction of the fluid medium, and at least one outlet from the channel in a surface of the sensor housing. The surface of the sensor housing has multiple recesses upstream from the outlet viewed in the main flow direction.

12 Claims, 1 Drawing Sheet

SENSOR SYSTEM FOR DETERMINING AT LEAST ONE PARAMETER OF A FLUID MEDIUM FLOWING THROUGH A CHANNEL

FIELD OF THE INVENTION

Numerous methods and devices for determining at least one flow property of fluid media, i.e., fluids and/or gases, are known from the related art. As a possible parameter, the flow properties may be any measurable physical and/or chemical properties which qualify or quantify a flow of the fluid medium. In particular, it may involve a flow speed and/or a mass flow rate and/or a volume flow rate.

BACKGROUND INFORMATION

The present invention is described below in particular with reference to so-called hot-film mass air flow sensors, as known, for example, from Konrad Reif (editor): "Sensoren im Kraftfahrzeug [Motor Vehicle Sensors]," 1st edition, 2010, pp 146-148. Such hot-film mass air flow sensors are generally based on a sensor chip, in particular a silicon sensor chip, for example, including a sensor diaphragm as a measuring surface or sensor area, over which the flowing fluid medium may flow. The sensor chip generally includes at least one heating element and at least two temperature sensors which are, for example, situated on the measuring surface of the sensor chip, the one temperature sensor being situated upstream from the heating element and the other temperature sensor being situated downstream from the heating element. It is possible to infer a mass flow rate and/or a volume flow rate of the fluid medium from an asymmetry of the temperature profile detected by the temperature sensors, which is influenced by the flow of the fluid medium.

Hot-film mass air flow sensors are generally designed as plug-in sensors which are able to be fixedly or replaceably introduced into a flow tube. For example, this flow tube may be an intake tract of an internal combustion engine.

A partial flow of the medium flows through at least one main channel provided in the hot-film mass air flow sensor. A bypass channel is formed between the inlet and the outlet of the main channel. In particular, the bypass channel is formed in such a way that it includes a curved section for redirecting the partial flow of the medium which has entered via the inlet of the main channel, the curved section transitioning further along into a section in which the sensor chip is situated. The last-mentioned section constitutes the actual measuring channel in which the sensor chip is situated.

In practice, such hot-film mass air flow sensors must satisfy a variety of requirements. In addition to the goal of minimizing a pressure drop at the hot-film mass air flow sensor overall via suitable fluidic designs, one of the main challenges is to further improve the signal quality and the ruggedness of the devices with respect to contamination by oil and water droplets, as well as sooty particles, dust particles, and other solid particles. This signal quality relates, for example, to a mass flow rate of the medium through the measuring channel leading to the sensor chip, and possibly to minimizing a signal drift and improving the signal-to-noise ratio. The signal drift relates to the deviation, for example, of the mass flow rate of the medium in terms of a change in the characteristic curve relationship between the mass flow rate actually occurring and the signal to be output which is ascertained as part of the calibration during manufacture. When ascertaining the signal-to-noise ratio, the sensor signals which are output in a rapid chronological sequence are considered, whereas the characteristic curve drift or signal drift relates to a change in the average value.

In the case of conventional hot-film mass air flow sensors of the type described, a sensor carrier including a sensor chip which is attached to it or introduced into it generally extends into the measuring channel. For example, the sensor chip may be glued into or onto the sensor carrier. The sensor carrier may, for example, form a unit having a bottom plate made of metal on which an electronic circuit, a control and evaluation circuit (for example, including a circuit carrier, in particular a printed circuit board), may also be glued. For example, the sensor carrier may be designed as an integrally injection-molded plastic part of an electronic module. The sensor chip and the control and evaluation circuit may, for example, be connected to each other via bond connections. The electronic module resulting in this way may, for example, be glued into a sensor housing, and the entire plug-in sensor may be sealed using covers.

German Published Patent Application No. 198 15 656 A1 describes a sensor system for determining at least one parameter of a fluid medium flowing through a channel, in particular an intake air mass of an internal combustion engine. The sensor system includes at least one sensor chip which is situated in the channel for determining the parameter of the fluid medium. The sensor chip is accommodated in a sensor carrier extending into the channel. The channel leads to an outlet opening emptying into a flow tube at an exterior surface of the sensor system. At least one protuberance is provided in the vicinity of the outlet opening on the outer surface of the sensor system having the outlet opening.

German Published Patent Application No. 197 38 337 A1 describes a hot-film mass air flow sensor having a step downstream from the outlet.

In such hot-film mass air flow sensors, a boundary layer forms continuously on the outer surface up to the bypass outlet. The large velocity range which the hot-film mass air flow sensor must cover results in the bypass outlet lying in a laminar, turbulent transition of the boundary layer at certain velocities. This transition area is characterized by poor reproducibility and nonlinear behavior. Thus, this results in a poorer adjustability and a complex behavior in the case of a pulsing flow which includes the transition area.

Therefore, hot-film mass air flow sensors have been developed in which a step having a separation edge is situated upstream and downstream from the bypass outlet, which forms a chimney-like projection. The step in the wall contour forces the regeneration of a turbulent boundary layer. Thus, interactions of the boundary layer at the bypass outlet with a possibly existing transition area upstream are minimized, making a more exact calibration to the target characteristic curve possible.

Despite the numerous advantages of the methods known from the related art for calibrating with the target characteristic curve, they still have potential for improvement with respect to other functional aspects. Thus, the height of the chimney-like projection required for a regeneration of the boundary layer increases with increasing air mass flow rate in the aforementioned related art. This conflicts with requirements for a preferably short sensor housing.

SUMMARY

Therefore, a sensor system is provided for determining at least one parameter of a fluid medium flowing through a channel, which may at least avoid the disadvantages of known methods and strategies and in which during a flow, a restart of the boundary layer is forced immediately upstream from the bypass outlet even at higher air mass flow rates, so that reproducible conditions are present during the calibration.

The sensor system for determining at least one parameter of a fluid medium flowing through a channel, in particular an intake air mass flow of an internal combustion engine, includes a sensor housing, in particular a plug-in sensor which is introduced or is introducible into a flow tube, in which the channel is formed, and at least one sensor chip which is situated in the channel for determining the parameter of the fluid medium. The sensor housing has an inlet into the channel which points counter to a main flow direction of the fluid medium, and at least one outlet from the channel in a surface of the sensor housing. The surface of the sensor housing has multiple recesses upstream from the outlet viewed in the main flow direction.

The recesses may be spaced apart from each other. The recesses may be formed as grooves. The recesses may be formed perpendicularly to the main flow direction. In particular, the recesses extend in parallel to a direction which is perpendicular to an upper side and a lower side of the sensor housing. The recesses may have a partial cross section. In other words, the recesses may be formed concavely in the sensor housing and have a cross section in the shape of a sector of a circle. The recesses are situated in the sensor housing in such a way that center points of their partial circular shape all lie on a shared circular path. The circular path has, for example, a radius of 10.3 mm. The center points of the partial circular shape of the recesses are spaced 15° apart on this circular path. In other words, the distance between two adjacent center points on the circular path is 15°. Die recesses may have a depth of 0.4 mm to 0.8 mm, for example, 0.6 mm.

The surface may have a step having a separation edge upstream from the outlet viewed in the main flow direction, the upstream step being adjacent to the outlet. The downstream step and the upstream step may form a chimney-like projection from the surface. The downstream step may protrude from 0.5 mm to 5 mm and preferably from 0.75 mm to 3 mm and even more preferably from 1.2 mm to 2.2 mm from the surface. The downstream step and/or the upstream step may protrude perpendicularly from the surface. The separation edge may have a dimension in the main flow direction from 0.2 mm to 0.4 mm and preferably from 0.25 mm to 0.35 mm. The downstream step and/or the upstream step may extend at least partially perpendicularly to the main flow direction. The downstream step and the upstream step may border the outlet on all sides. The outlet may be situated at a position of the surface in which the fluid flowing in the main flow direction is turbulent. The outlet may have a rectangular opening cross section.

In the context of the present invention, the main flow direction is to be understood to be the local flow direction of the fluid medium at the location of the sensor or the sensor system, it being possible, for example, for local irregularities such as turbulences to remain disregarded. In particular, the main flow direction may thus be understood to be the local average transport direction of the flowing fluid medium at the location of the sensor system. The average transport direction relates to a transport direction in which the fluid medium flows predominantly on average over time.

In the context of the present invention, a downstream arrangement is to be viewed as the arrangement of a component at a position which the fluid medium flowing in the main flow direction reaches chronologically later than a reference point. Thus, for example, a downstream arrangement of a step with respect to the outlet means that the fluid medium reaches the step later from a chronological point of view than the outlet.

Similarly, in the context of the present invention, an upstream arrangement of a component is to be understood to be an arrangement of the component at a position which the fluid medium flowing in the main flow direction reaches earlier from a chronological point of view than a reference point. Thus, for example, an upstream arrangement of a step with respect to an outlet means that the fluid medium first reaches the step earlier from a chronological point of view than the outlet.

In the context of the present invention, a step is to be understood to be a projection from the surface of the sensor housing.

In the context of the present invention, a separation edge is to be understood to be a component which is sharp-edged or designed having a very small curve radius, which is configured to cause a stall or a flow separation of the fluid medium.

In the context of the present invention, a turbulent flow is to be understood to be a mostly three-dimensional, apparently random unsteady movement of the fluid particles. The flow is turbulent if its Reynolds number is greater than the critical Reynolds number, i.e., greater than approximately 2300.

One basic idea of the present invention is to provide groove-shaped recesses in the wall contour upstream from the bypass outlet. As a result, the regeneration of a turbulent boundary layer is forced even in a relatively flat or short chimney-like projection, and interactions of the boundary layer at the bypass outlet with a possibly existing transition area upstream are minimized, thus making a more exact calibration to the target characteristic curve possible.

The sensor system according to the present invention thus makes possible a particular optimized form of the outlet of a hot-film mass air flow sensor which forces a restart of the boundary layer immediately upstream from the outlet, so that reproducible conditions exist during calibration. It is thus possible to achieve lower tolerances in this operating area. In addition, the optimized outlet contour significantly simplifies the adjustment of the pulsation behavior. Since the pulsation behavior is essentially determined by the bypass channel length, moving the outlet position is an effective means for setting the pulsation behavior. However, in conventional hot-film mass air flow sensors, moving the outlet position would also change the position in the boundary layer and thus the pressure prevailing at the outlet, so that complex interdependencies result. The optimized embodiment of the sensor system according to the present invention does not change the position in the boundary layer, so that this influencing parameter is negligible when adjusting the pulsation behavior. Thus, the pulsation behavior is significantly simpler to adjust. In particular, the bypass outlet is extended in a chimney-like manner, i.e., is no longer flush with the adjacent walls, as is the case in the related art. The wall contour is thus no longer continuous, but has a step immediately before and after the bypass outlet.

The groove-shaped recesses in the wall contour upstream from the bypass outlet force subcritical separations which result in a regeneration of the flow to the wall contour. As a result, it is ensured even in the case of higher air mass flow rates that the flow separates at the bypass outlet which is extended in a chimney-like manner, and a new turbulent boundary layer forms.

DETAILED DESCRIPTION

Figure 1:
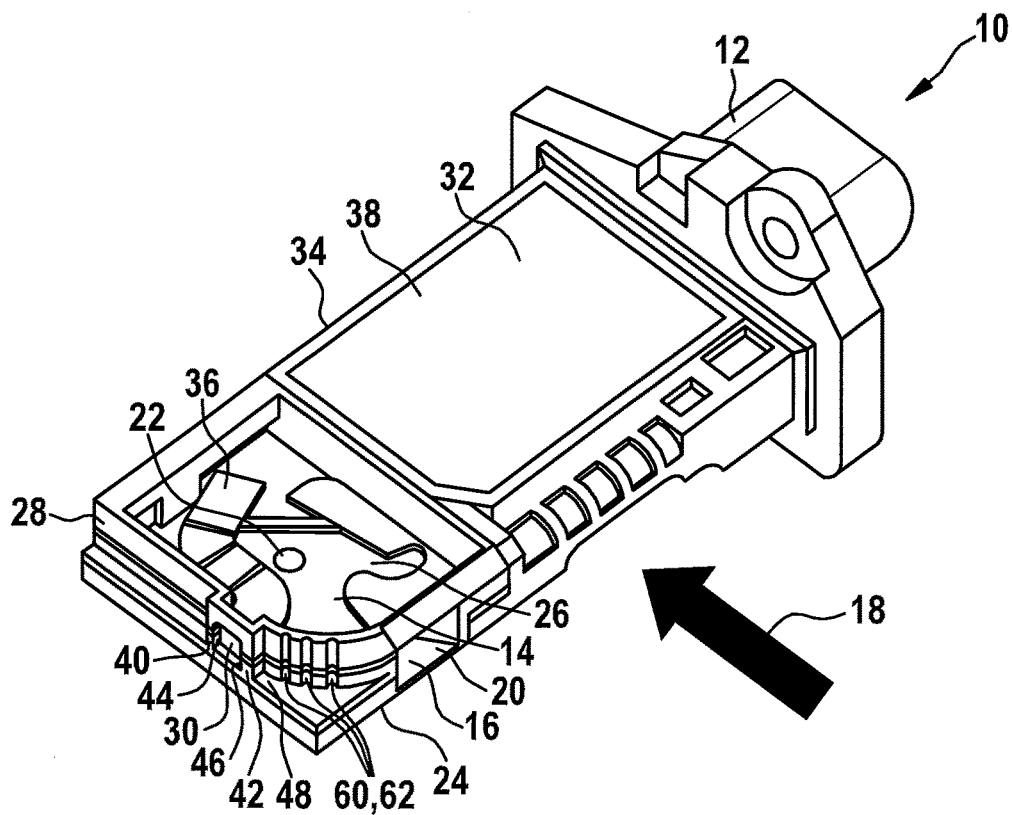
FIG. 1 shows a perspective view of a sensor system.

FIG. 1 shows a sensor system 10 for determining a parameter of a fluid medium flowing through a channel. In this exemplary embodiment, sensor system 10 is designed as a hot-film mass air flow sensor and may in particular detect an intake air mass flow of an internal combustion engine. In this exemplary embodiment, sensor system 10 includes a plug-in sensor 12 which, for example, may be inserted into a flow tube, in particular an intake tract of the internal combustion engine. A channel structure 14 is accommodated in plug-in sensor 12 through which a representative quantity of the fluid medium is able to flow via an inlet opening or an inlet 16 which points counter to a main flow direction 18 of the fluid medium in the inserted state.

FIG. 1 shows a section of plug-in sensor 12 in the area of channel structure 14. Channel structure 14 has a main channel 20 which opens into a main channel outlet 22 on a lower side 24 of plug-in sensor 12 with respect to the depiction in FIG. 1, and a bypass or measuring channel 26 branching off from main channel 20, which opens into an outlet 30 of bypass or measuring channel 26 which is situated on surface 28, which in this exemplary embodiment may be the front side or front surface with respect to the depiction in FIG. 1 of plug-in sensor 12. However, it is explicitly emphasized that outlet 30 may also be situated in another surface of plug-in sensor 12, such as in lower side 24 or an upper side.

As in conventional hot-film mass air flow sensors, a wing-shaped sensor carrier, which is not shown, extends into measuring channel 26. In this sensor carrier, a sensor chip is embedded in such a way that the fluid medium flows over a sensor diaphragm designed as a sensor area of the sensor chip. Along with the sensor chip, the sensor carrier is an integral part of an electronic module which has a curved bottom plate as a sensor carrier and a printed circuit board which is attached to it, for example, glued to it, which includes a control and evaluation circuit. The sensor carrier may, for example, be integrally injection-molded to the bottom plate as a plastic component. The sensor carrier, which, for example, is integrally injection-molded to the bottom plate as an injection mold component or may be integrally designed including the bottom plate of the printed circuit board, is provided with a leading edge which may be rounded.

The sensor chip is electrically connected to the control and evaluation circuit via electrical connections which may be designed here as wire bonding. The electronic module which results in this way is introduced, for example, glued, into an electronics compartment 32 of a sensor housing 34 of plug-in sensor 12 in which channel structure 14 is also formed. This may be carried out in such a way that the sensor carrier extends into channel structure 14. Subsequently, the electronics compartment and channel structure 14 are sealed using covers 36, 38.

It is apparent from FIG. 1 that front surface 28 includes a downstream step 40, i.e., a step downstream from outlet 30, and an upstream step 42, i.e., a step upstream from outlet 30. Downstream step 40 and upstream step 42 are adjacent to outlet 30. In particular, downstream step 40 and upstream step 42 extend at least partially perpendicularly to main flow direction 18. Downstream step 40 and upstream step 42 each have a separation edge 44, 46. Downstream step 40 and upstream step 42 may border outlet 30 on all sides as shown in FIG. 1. Outlet 30 has, for example, a rectangular opening cross section. Downstream step 40 and/or upstream step 42 protrude(s) perpendicularly from front surface 28. Downstream step 40 and upstream step 42 thus form a chimney-like projection 48 from front surface 28. For example, downstream step 40 and/or upstream step 42 may protrude from 0.5 mm to 5 mm, preferably from 0.75 mm to 3 mm, and even more preferably from 1.2 mm to 2.2 mm from front surface 28, for example, 1.5 mm. Separation edge 44 of downstream step 40 and/or separation edge 46 of upstream step 42 has/have a dimension in main flow direction 18 from 0.2 mm to 0.4 mm and preferably from 0.25 mm to 0.35 mm, for example, 0.3 mm.

Figure 2:
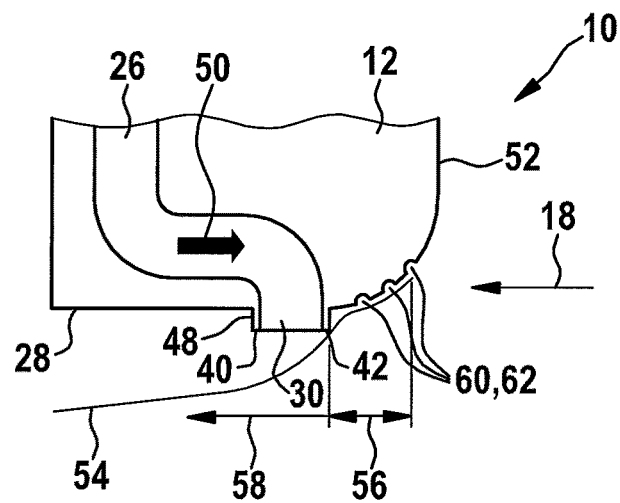
FIG. 2 shows a schematic top view of the sensor system in the area of the outlet.

FIG. 2 schematically depicts a top view of plug-in sensor 12 in the area of outlet 30. In particular, the flow through bypass channel 26 is indicated by an arrow 50. In particular, a normal operation, i.e., a pulsation-free flow of the fluid medium, is shown in main flow direction 18.

In a conventional design of outlet 30, in which outlet 30 is flush with front surface 28, a stagnation point of the flowing fluid medium forms in a transition area, from a side area 52 pointing counter to main flow direction 18 in which inlet 16 is also formed, into front surface 28. The formation of a laminar boundary layer begins in the immediate vicinity of the stagnation point. The boundary layer becomes thicker with increasing running length along the transition area and front surface 28 in the direction toward outlet 30. The boundary layer is initially laminar up to immediately upstream from outlet 30. Starting at a critical boundary layer thickness, disturbances in the boundary layer are no longer sufficiently dampened, so it becomes turbulent. The turbulent flow may result at the level of outlet 30, i.e., in a shared plane perpendicular to main flow direction 18, or at the level of its downstream end, or downstream from outlet 30, as a function of flow-influencing parameters such as wall friction, flow pulses, flow speed, and the like.

The transition between a laminar and turbulent boundary layer occurs in a transition area upstream from outlet 30, at the latest in the area of the outlet, i.e., at the level of outlet 30. This transition area is characterized by poor reproducibility, since it responds in a highly sensitive manner to the various boundary conditions. For example, the transition area is in the area of outlet 30. The conventional hot-film mass air flow sensor is difficult to calibrate at this velocity range due to the poor reproducibility of the transition area.

Since the position of the transition area changes with the velocity of the air flow, an operating state may be set in the case of pulsing flow in which outlet 30 is intermittently marginally in the transition area during operation. If a slight change of the pulsation amplitude or the average flow speed now results in bypass channel 26 no longer being traversed by the transition area, this may have a nonlinear effect on the average air mass flow rate in bypass channel 26, from which the sensor chip generates the measuring signal. As a result, the pulsation behavior of the hot-film mass air flow sensor is also nonlinear, thus making the application in the vehicle more difficult.

Sensor system 10 according to the present invention avoids this problem in that outlet 30 is not flush with front surface 28, but has the aforementioned shape. As mentioned above, according to the present invention, outlet 30 is formed as a chimney-like projection 48 from front surface 28. Outlet 30 is extended in a chimney-like manner in such a way that steps 40, 42 force the regeneration of a turbulent boundary layer. Correspondingly, outlet 30 is situated at a position on front surface 28 at which the flow is turbulent. FIG. 2 shows this behavior more exactly based on an exemplary flow line 54. Downstream from the transition of side area 52 pointing counter to main flow direction 18 into front surface 28, the flow is transitional starting at a position 56. Starting at a position 58 which is at the level of upstream step 42, the regeneration of a turbulent boundary layer occurs. Thus, the transition area is always outside or upstream from outlet 30. The transition area lies in particular only between positions 56 and 58.

In order to force the regeneration of a turbulent boundary layer even in the case of higher air mass flow rates without extending chimney-like projection 48 from front surface 28 and thus deviating from the aforementioned dimensions, the present invention provides that surface 28 has multiple recesses 60 upstream from outlet 30 viewed in main flow direction 18. Recesses 60 are spaced apart from each other. As is apparent from FIG. 1, the recesses are formed as grooves 62. Grooves 62 are in particular formed perpendicularly to main flow direction 18. Grooves 62 also extend perpendicularly to an extension direction of plug-in sensor 12. For example, grooves 62 extend from the upper side in the direction toward lower side 24 of sensor housing 34 or vice-versa. Recesses 60 may have a partial cross section. In other words, the recesses may be formed concavely in plug-in sensor 12 and have a cross section in the shape of a sector of a circle. Recesses 60 are situated in plug-in sensor 12 in such a way that center points of their partial circular shape all lie on a shared circular path. The circular path has, for example, a radius of 10.3 mm. The center points of the partial circular shape of the recesses are spaced 15° apart on this circular path. In other words, the distance between two adjacent center points on the circular path is 15°. Recesses 60 may have a depth of 0.4 mm to 0.8 mm, for example, 0.6 mm.

As a result of the regeneration of the boundary layer starting at position 58, interactions of the boundary layer at outlet 30 with a possibly existing transition area upstream from it are also minimized. As a result, sensor system 10 may be calibrated well even in the case of flow speeds which would generate a transition area at a continuous wall contour in a conventional hot-film mass air flow sensor. If the position of outlet 30 is moved within the scope of adjustments of the pulsation behavior, the basic pulsation behavior will change substantially less than in embodiments according to the related art, since the influence of the transition area has been minimized Thus, based on a good initial configuration, it is possible to rapidly generate variants of sensor system 10 according to the present invention whose basic behavior is similar but which are adapted to particular customer requirements.

Since the requirement for a longer chimney-like projection 48 is in conflict with customer requirements for a preferably short overall length of sensor housing 34, an extension of chimney-like projection 48 seen from front surface 28 for compensating for higher air mass flow rates is possible only to a certain extent. According to the present invention, this problem as described above is solved in that recesses 60, which may be formed as grooves 62, are provided in front surface 28 in the otherwise smooth wall contour of front surface 28. Recesses 60 repeatedly force subcritical separations which result in a restart of the flow. Thus, a regeneration of the boundary layer starting at position 58 may be forced in the case of an equally high chimney-like projection 48 even at high flow speeds.

This effect is comparable to the effect of dimples on a golf ball, which delay the separation of the flow so that the golf ball flies farther than a smooth ball which generates a greater separation and is thus more strongly decelerated. However, since the flow against sensor housing 34 occurs in a known manner having a clear preferred direction, i.e., in the main flow direction 18, grooves 62 are more effective and also require no additional expenditure with respect to tools and are thus simpler to manufacture than dimples. Thus, grooves 62 may be manufactured using injection molding, whereas dimples would require an additional slider in the injection molding tool, which would increase manufacturing costs.

What is claimed is:

1. A sensor system for determining at least one parameter of a fluid medium flowing through a channel, comprising:
   a sensor housing which is introduced or is introducible into a flow tube, in which the channel is formed; and
   at least one sensor chip situated in the channel and for determining the parameter of the fluid medium,
   wherein:
   the sensor housing includes:
      an inlet into the channel which points counter to a main flow direction of the fluid medium, and
      at least one outlet from the channel in a surface of the sensor housing, and
   the surface of the sensor housing has multiple recesses upstream from the outlet and downstream from the inlet as viewed in the main flow direction.

2. The sensor system as recited in claim 1, wherein the fluid medium includes an intake air mass flow of an internal combustion engine.

3. The sensor system as recited in claim 1, wherein the sensor housing includes a plug-in sensor.

4. The sensor system as recited in claim 1, wherein the recesses are spaced apart from each other.

5. The sensor system as recited in claim 1, wherein the recesses are formed as grooves.

6. The sensor system as recited in claim 1, wherein the recesses are formed perpendicularly to the main flow direction.

7. The sensor system as recited in claim 1, wherein the recesses lie on a shared circular path of the sensor housing between the inlet and the outlet.

8. The sensor system as recited in claim 1, wherein the surface of the sensor housing has a step having a separation edge downstream from the outlet as viewed in the main flow direction, the step being adjacent to the outlet.

9. The sensor system as recited in claim 8, wherein the surface has a further step having a separation edge upstream from the outlet as viewed in the main flow direction, the upstream step being adjacent to the outlet.

10. The sensor system as recited in claim 9, wherein at least one of the upstream step and the downstream step forms a chimney-like projection from the surface.

11. The sensor system as recited in claim 9, wherein at least one of the downstream step and the upstream step protrudes perpendicularly from the surface.

12. The sensor system as recited in claim 9, wherein at least one of the downstream step and the upstream step extends at least partially perpendicularly to the main flow direction.

* * * * *